United States Patent
Rouhana et al.

(10) Patent No.: US 6,773,075 B2
(45) Date of Patent: Aug. 10, 2004

(54) FOUR POINT SEAT BELT RESTRAINT SYSTEM

(75) Inventors: Stephen William Rouhana, Plymouth, MI (US); Paul George Bedewi, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 37 days.

(21) Appl. No.: 09/683,607

(22) Filed: Jan. 24, 2002

(65) Prior Publication Data

US 2003/0137180 A1 Jul. 24, 2003

(51) Int. Cl.[7] ............................................. B60R 22/34
(52) U.S. Cl. ............... 297/484; 297/216.1; 297/216.12; 297/216.13; 297/478; 242/379.1; 242/378.4
(58) Field of Search ............... 297/484, 216.1, 297/478; 242/379.1, 378, 378.4

(56) References Cited

U.S. PATENT DOCUMENTS

| | | | | |
|---|---|---|---|---|
| 2,899,146 A | * | 8/1959 | Barecki | 242/378.4 X |
| 3,321,246 A | * | 5/1967 | Davies | 297/478 X |
| 5,123,673 A | | 6/1992 | Tame | 297/484 X |
| 5,694,320 A | * | 12/1997 | Breed | 297/216.12 X |
| 5,748,473 A | * | 5/1998 | Breed | 297/410 X |
| 5,788,281 A | * | 8/1998 | Yanagi et al. | 297/480 X |
| 5,820,056 A | * | 10/1998 | Dybro et al. | 242/379.1 X |
| 6,076,894 A | | 6/2000 | Busch | 297/484 |
| 6,113,185 A | * | 9/2000 | Yamaguchi | 297/216.1 |
| 6,131,843 A | * | 10/2000 | Singer et al. | 242/379.1 |
| 6,139,111 A | | 10/2000 | Pywell et al. | 297/484 |
| 6,237,945 B1 | * | 5/2001 | Aboud et al. | 297/484 X |
| 6,290,159 B1 | | 9/2001 | Specht et al. | 242/379.1 |
| 6,293,588 B1 | * | 9/2001 | Clume | 297/484 X |
| 6,305,713 B1 | * | 10/2001 | Pywell et al. | 297/484 X |
| 6,309,024 B1 | * | 10/2001 | Busch | 297/484 |
| 6,311,918 B1 | * | 11/2001 | Specht | 242/379.1 X |
| 6,322,017 B1 | * | 11/2001 | Smithson et al. | 242/379.1 |
| 6,331,014 B1 | * | 12/2001 | Breed | 297/216.13 X |
| 6,367,882 B1 | * | 4/2002 | Van Druff et al. | 297/484 |
| 6,375,270 B1 | * | 4/2002 | Sullivan et al. | 297/484 |
| 6,386,631 B1 | * | 5/2002 | Masuda et al. | 297/216.1 |
| 6,450,573 B1 | * | 9/2002 | Yamaguchi et al. | 297/216.1 |
| 2002/0053792 A1 | * | 5/2002 | Yamaguchi et al. | 297/216.1 X |
| 2002/0053793 A1 | * | 5/2002 | Yamaguchi et al. | 297/216.1 X |

FOREIGN PATENT DOCUMENTS

WO     WO 00/71394 A1     11/2000

* cited by examiner

Primary Examiner—Rodney B White
(74) Attorney, Agent, or Firm—Gary A. Smith

(57) ABSTRACT

A four-point seat belt system for restraining a vehicle occupant in a vehicle seat. Two shoulder belts mounted on separate spool members are connected to a common retractor mechanism, which synchronizes web payout and retraction and also shares a load limiting function. The shoulder belts are connected to a lap belt, which is buckled centrally on the abdomen of the occupant. A load limiting system controls occupant motion and reduces force levels on the occupant's chest. A single load limiting method can be used to accommodate all occupants of the vehicle with specific force versus belt payout properties.

20 Claims, 5 Drawing Sheets

FOUR POINT SEAT BELT RESTRAINT SYSTEM

BACKGROUND OF INVENTION

The present invention relates to a four-point seat belt system for restraining a vehicle occupant in a vehicle seat.

It is known in the vehicle art to provide various types of seat belts or restraint systems for restraining an occupant in his or her seat and providing controlled deceleration of portions of the body to limit the forces applied to the occupant's body during rapid deceleration of a vehicle from a cause such as a collision. Various types of seat belts and restraint systems have been used in automobiles, trucks, and other vehicles and are commonly known today.

Known seat belt systems typically used in commercially available production vehicles are three-point restraint systems with a lap belt and a shoulder belt extending over one shoulder of the occupant and connecting with the lap belt. The lap belts are anchored at one end, to the seat or to the vehicle adjacent the seat. The shoulder belts are connected at one end to the vehicle and at the other end to the lap belt or lap belt buckle mechanism.

Four, Five, and Six-point restraint systems are among some of the seat belt and restraint systems that are particularly utilized in off-road type vehicles and other sport-type vehicles in order to provide additional restraint for occupants over two and three-point restraint systems. These seat belt systems tend to have multiple adjustable cinching mechanisms and are awkward and difficult to operate and properly position on an occupant.

A need exists today for improved four-point seat belt restraint systems for use in vehicles. A need particularly exists for four-point seat belt systems having proper belt alignment and routing during use and crash events, as well as controlled decelerations to limit the forces applied to the occupant's body during crash and load events regardless of the direction of the forces and loading.

A need also exists for a 4-point restraint that prevents "submarining" by shifting of the lap-belt portion of the belt system from the pelvis to the abdomen during a crash event or other means.

SUMMARY OF INVENTION

The present invention provides a four-point seat belt system mounted on a vehicle seat, which maintains proper belt alignment and routing for the four-point system during normal use and crash events, as well as properly reducing and distributing forces applied to the body of the occupant during rapid deceleration conditions. The mechanism includes separate spools for the shoulder belts connected to a common retractor mechanism. The mechanism is preferably located in the rear of the vehicle seat and enables the shoulder belts to act in unison during normal use and share common load limits for optimum and symmetric payout during crash events. A load limiting mechanism is provided in the retractor mechanism. The common retractor also eliminates redundant parts for potential weight, cost, and package space savings.

The lap belt includes a pair of straps, one extending from either side of the seat. A two-piece buckle latches the lap belt straps together. Each of the shoulder belts are attached to one-half of the buckle or latch mechanism so that the four-point seat belt system is completed when the lap belt buckle is fastened.

With the present invention, the shoulder and lap belts join at a central buckle located at the center of the occupant's lower abdominal region, in front of the pelvis. The load limiting of the shoulder belt is controlled through a single energy management system, which acts simultaneously on both of the shoulder belts.

With separate spools for the belts and a common retractor mechanism, the angle of the seat belts over the top of the vehicle seat, through guides in the head restraint, or through the seat back remains the same throughout the extension of the seat belts. The payout of the two spools remains in unison with a common retractor mechanism. This also allows the shoulder belt to share common load limits under all circumstances.

The present invention also limits the ability of an occupant from submarining, may be applicable to commercially available high-volume production vehicles, and is relatively easy to operate.

DETAILED DESCRIPTION

In the following description, various operating parameters and components are described for one constructed embodiment. These specific parameters and components are included as examples and are not meant to be limiting.

Figure 1A:
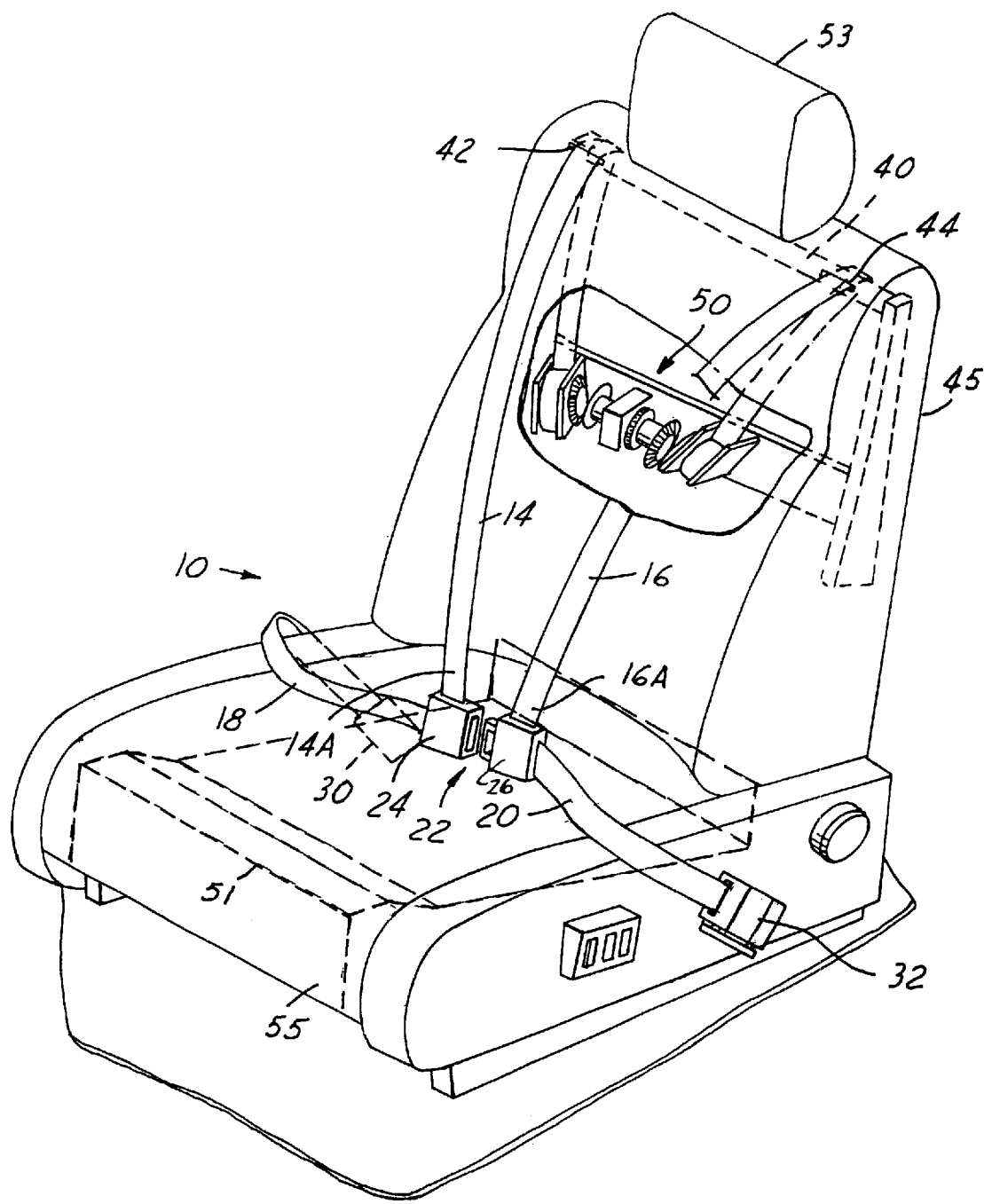
FIG. 1A illustrates a vehicle seat incorporating a retractor mechanism in accordance with an embodiment of the present invention.

In FIG. 1A, the four-point seat belt system is referred to generally by the reference numeral 10 and is shown mounted on a vehicle seat 12. The system 10 includes a pair of shoulder strap belt members 14 and 16 and a pair of lap belt strap members 18 and 20.

Each of the lap belt strap members 18 and 20 are connected at one end to the vehicle seat and are connected together at the other ends by a two-piece buckle or latch mechanism 22. The two portions of the buckle mechanism are separately identified by reference numerals 24 and 26. The lower ends 14A and 16A of the shoulder belt strap members 14 and 16, respectively, are connected to the two portions 24 and 26 of the buckle mechanism 22. The buckle mechanism 22 can be of any conventional type, which can be used with the present invention. In addition, the ends 14A and 16A of the shoulder belt strap members can be attached to the buckle portions 24 and 26 in any conventional manner. Preferably the lower ends 14A and 16A of the shoulder belt strap members are permanently securely attached to the buckle mechanism 22 and cannot be detached by the occupant. In this manner, the four-point seat belt mechanism or system 10 can be easily secured around the occupant simply by latching the buckle 22. At that point, the ends of all four of the belt members are secured together at one point.

The outer ends of the lap belt strap members 18 and 20 are connected to conventional spool-type belt retractor mechanisms 30 and 32. Preferably, the retractor mechanisms 30 and 32 are positioned in the vehicle seat 12, although the retractors could also be positioned on the floor of the vehicle or otherwise attached directly to the vehicle. The retractor mechanisms 30 and 32 can be of the type and have spring mechanisms which allow the lap belt members 18 and 20 to be retracted and be rewound on the spools of the retractors when the buckle mechanism 22 is opened and the buckle portions 24 and 26 are detached.

As shown in FIG. 1A, the two shoulder belt members 14 and 16 extend upwardly over or adjacent to the top edge 40 of the vehicle seat 12, or through adjustable guide loops in the head restraint or through the seat back, if necessary to accommodate various occupant sizes. They are also preferably positioned in belt guides 42 and 44 on the vehicle seat. The shoulder belt strap members 14 and 16 extend partially down the back or rear 45 of the vehicle seat and are connected to a load limiting retractor mechanism 50.

The mechanism 50 is preferably positioned inside the back of the vehicle seat mechanism 50 includes a pair of spool members 52 and 54 in which the shoulder belt strap members 14 and 16 are wound. The spool members 52 and 54 being biased for coiling and holding portions of the shoulder belt strap members 14 and 16. In this manner, the vehicle seat and four-point seat belt system can be provided as a unit for assembly or installation in a vehicle. It is understood, of course, that the mechanism 50 may be attached to the floor of the vehicle or to various other structural members of a vehicle. The mechanism 50 may also be attached up high on the seat back near the head restraint 53, down low near the seat pan 55, or in the head restraint 53.

The mechanism 50 is designed to control occupant motion and reduce force levels on the occupant's chest. During a crash event the system allows the occupant's torso to reach the vertical position or forward of vertical at the time of peak belt forces. The pretensioning of the lap belt retractor(s) 30 and 32 by pyrotechnical, electrical, mechanical, or other means ensures contact of the lap belts 18 and 20 with the pelvis during the crash loading. A seat ramp 51, also included in the system 10, further minimizes the horizontal travel and vertical drop of the occupant's pelvis. The seat ramp 51 may be of various type, style, material, and shape as known in the art. The seat ramp 51 is commonly made from sheet metal and may be deformable during a collision. The seat-ramp 51 is most commonly located beneath seat cushion padding, under the occupant's pelvis and thigh region. The seat ramp 51 is angled with the front portion higher vertically than the rear portion, so as to prevent the forward horizontal travel of an occupant during a forward collision. In order for an occupant to travel in a forward direction the occupant would need to slide up the seat ramp 51 against the force of gravity, rather than for example a flat seat, which would have less resistance. Also, for a similar reason the seat ramp 51 in having an inclined shape, during a forward collision, when an occupant tends to move forward in the direction of the collision, the shape and material of the seat pan 51 resists the ability for the occupant's pelvis to drop vertically. The combination of the above-described system components, when properly coupled, prevents the possibility of the shoulder belts 14 and 16 from pulling the lap belts 18 and 20 off of the pelvis during a crash, resulting in one form of "submarining" whereby the occupant's pelvis slides under the lap belt. The combination of the above-described system components, when properly coupled, prevents the possibility of the shoulder belts 14 and 16 from pulling the lap belts 18 and 20 off of the pelvis during a crash, resulting in one form of "submarining" whereby the occupant's pelvis slides under the lap belt.

Figure 1B:
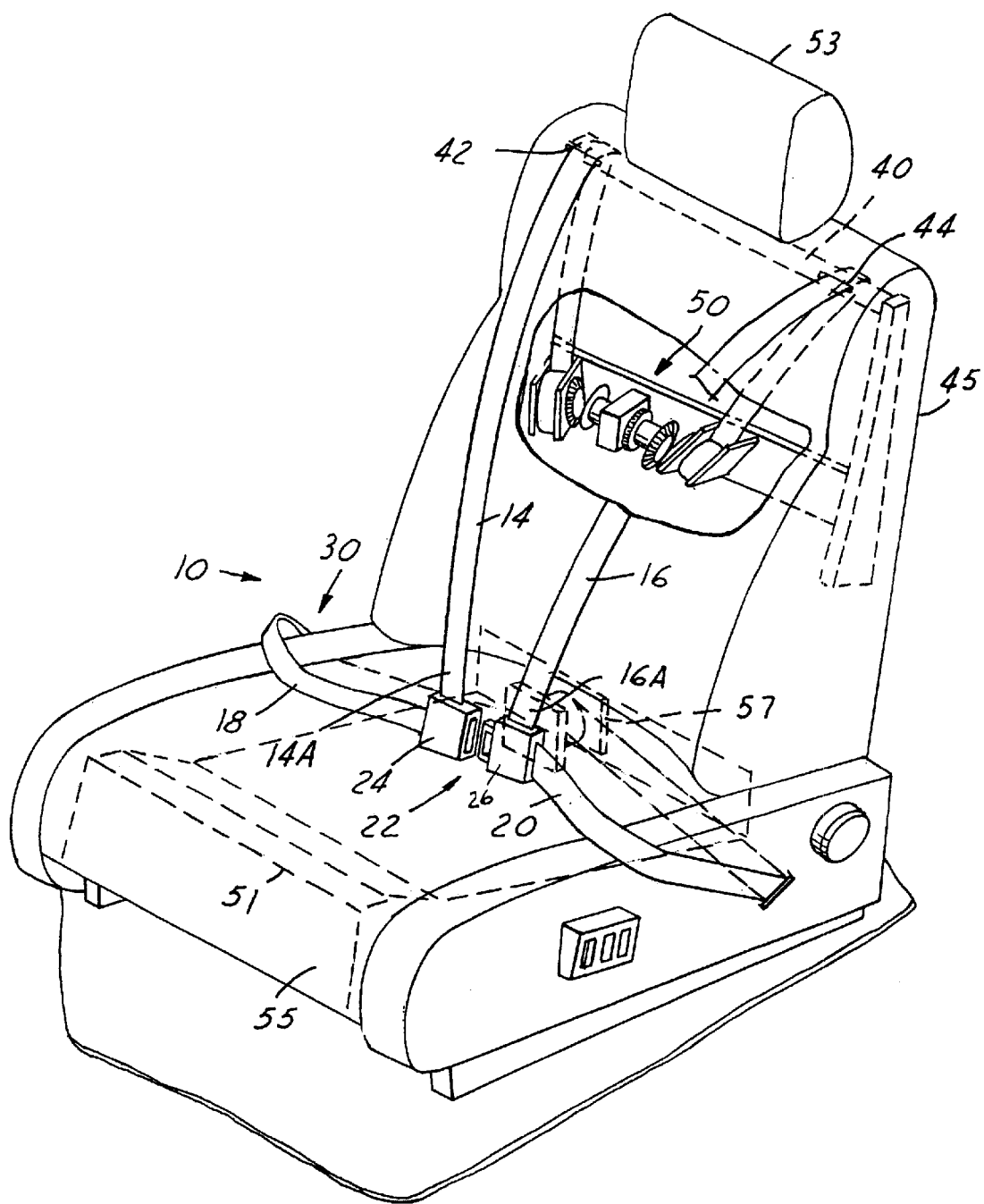
FIG. 1B illustrates a vehicle seat incorporating the retractor mechanism in accordance with another embodiment of the present invention.
Figure 1C:
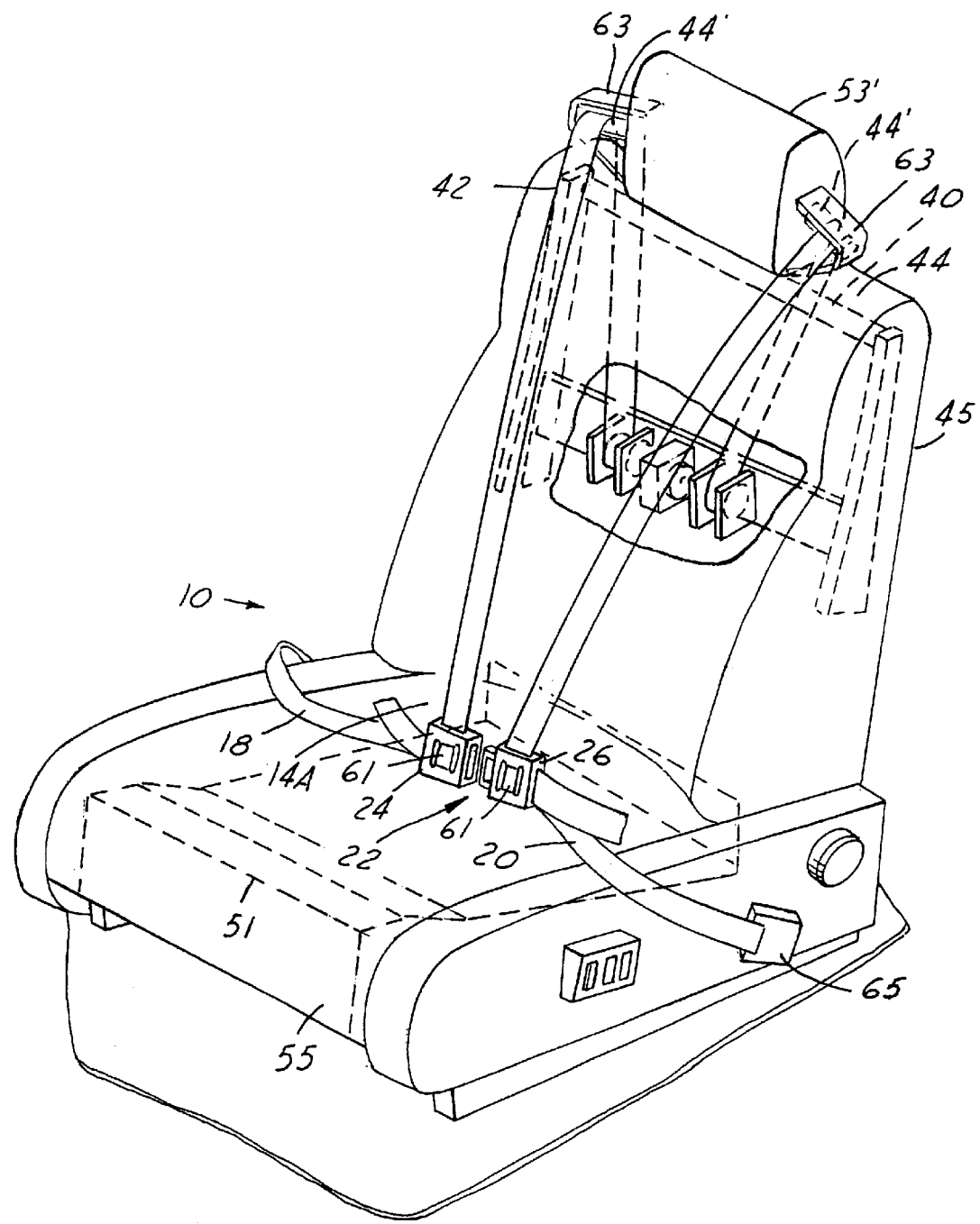
FIG. 1C illustrates a vehicle seat incorporating the retractor mechanism in accordance with another embodiment of the present invention.

Referring now to FIGS. 1B and 1C, illustrations of a vehicle seat incorporating the mechanism 50 in accordance with other embodiments of the present invention are shown. The retractors 30 and 32 may alternatively be replaced by a dual payout single retractor 57, which may be located in the seat pan 55, or underneath or behind system 10. The shoulder belts 14 and 16 may slip through strap guide members 44" in the head restraint 53" onto rollers 63 to mechanism 50 providing another alternative configuration. The lap belts 18 and 20 may also be fixed/anchored to the sides of the vehicle seat or to the vehicle structure by lap belt anchors 65 and 67. When the lap belts are fixed, they are preferably adjustable through a cinching mechanism 61 located either in the buckle 22 or attached to the lap belts 18 and 20 by other means known in the art.

Figure 2:
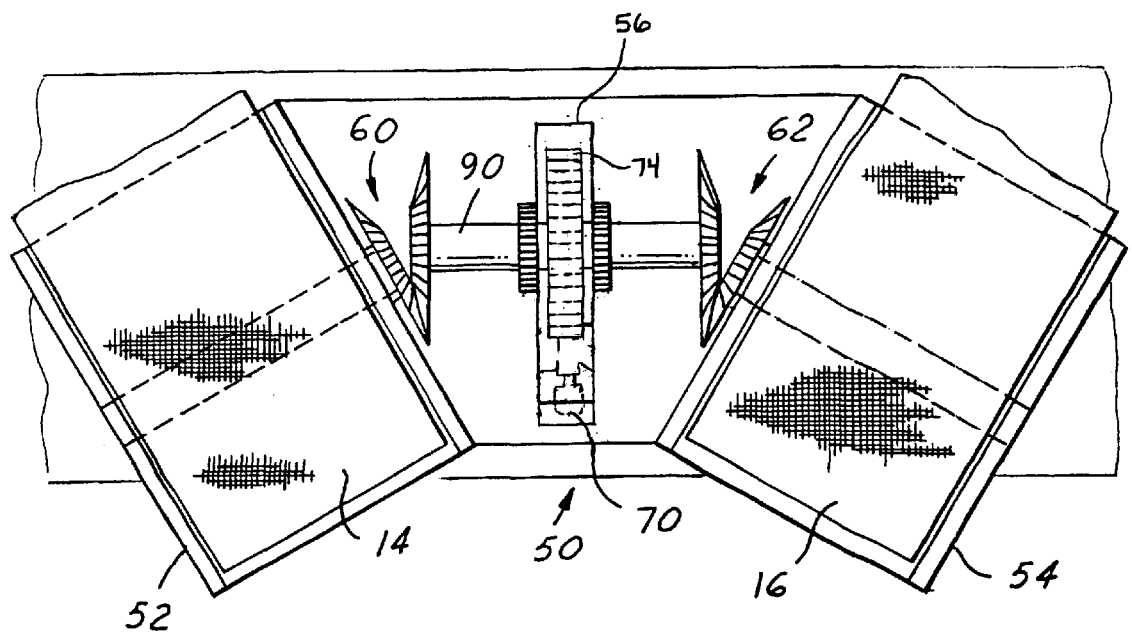
FIG. 2 illustrates a retractor mechanism in accordance with an embodiment of the present invention.
Figure 3:
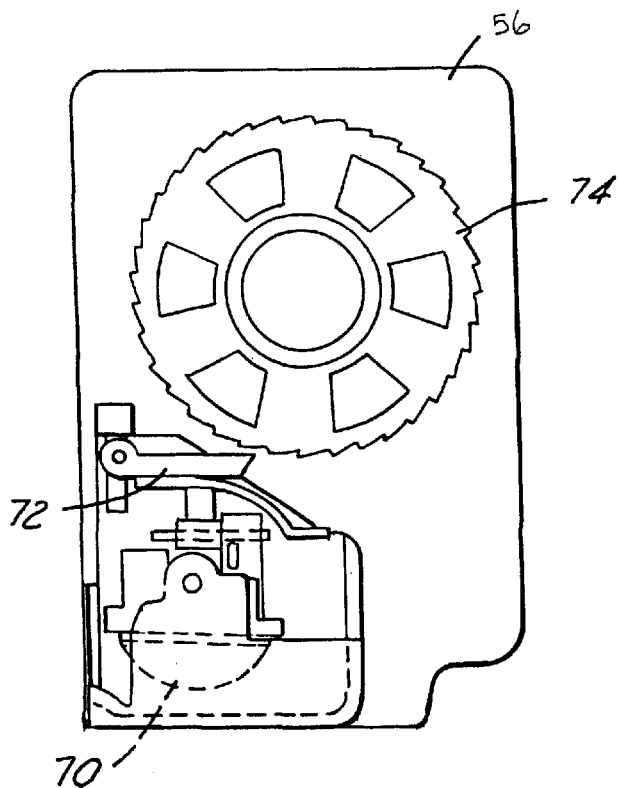
FIG. 3 is a side view of a portion of a common retractor device shown in FIG. 2.
Figure 4:
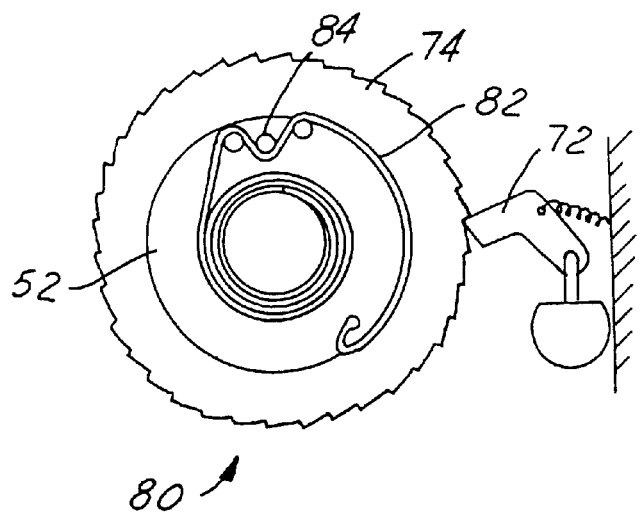
FIG. 4 illustrates one type of energy management system for use in the present invention.

The mechanism 50 is better shown in FIGS. 2 and 3. A common retractor device 56 is also contained in the mechanism 50 and operatively connected to the two shoulder belt spool members 52 and 54. For this purpose, pairs of gears 60 and 62, either beveled or straight, are provided at any predetermined angle or in a straight line to allow common retractor device 56 to enable shoulder belt members 14 and 16 to act in unison during normal use and share common load limits. A common retractor device 56 also eliminates redundant parts for potential weight, cost, and package space savings.

As indicated, each of the shoulder belt strap members 14 and 16 are mounted on a separate spool and also positioned at an appropriate angle for left and right belt routing. The common retractor device 56 controls the webbing extraction/retraction for both spool members simultaneously.

One known system today mounts the shoulder belt strap members on separate retractors. This has the disadvantage of additional components, which add weight and cost. In the present invention many duplicate parts are eliminated and the load limiting is provided from a central source, namely the common retractor mechanism 56. Thus, the occupant receives more optimized load limits for all impact directions, even if shoulder belts are asymmetrically loaded.

In another known four-point seat belt system, the shoulder belts are mounted to a single retractor, but the two seat belts are connected by a common Y-yoke and enter the spool through a single webbing strap. This system has the disadvantage that, as the webbing extracts, the intersection point where the shoulder belts meet moves toward the top edge of the rear of the seat. The shoulder belts thus have a continuously variable line of action through the seat back and/or body structure. As this line of action changes, the friction around the belt guides on the rear or top of the seat can change. These frictional changes can significantly affect occupant comfort and proper performance of the energy management system. The present invention eliminates any concern by providing fixed belt routing which optimizes the comfort and safety performance of the system. As indicated above, the mechanism 50 can also be mounted on either the vehicle body structure or along or in the back of the vehicle seat 12.

The mechanism 50 also includes a gimble locking mechanism 70. The gimble mechanism compensates for any changes in the orientation of the back of the vehicle seat 12 during use thereof by the occupant. The gimble also compensates for all orientations of the vehicle, for example, if the vehicle is headed uphill or downhill during a crash event. The gimble locking mechanism 70 can be of any conventional type known today used for seat belt retractors. The gimble mechanism activates a lever 72, which in turn locks up a sprocket 74 on one side of the common refractor device 56.

The present invention also provides controlled deceleration in order to limit the forces applied to the occupant's body during rapid deceleration of the vehicle from a cause such as a collision. In this regard, the load limiting of the present invention is controlled through a single energy management system 80, which acts on both belts simultaneously. In a preferred embodiment, a metal band 82 is provided which is wound around the central retractor device 52. A "tortuous path" load limiting feature 84 is utilized with the metal band 82. The metal band is plastically deformed during a crash event creating a specified energy management result. Other manners or methods in which energy management can be activated include conventional torsion bars, bending metal, crush tubes, shear pins, and the like.

The deformation of the metal band provides controlled deceleration of the vehicle occupant during rapid deceleration of the vehicle, such as during a crash event, and thus limits the forces applied to the occupant's body. This helps prevent undue injury to the occupant during sudden deceleration. Although the seat belt retractors lock up preventing any further extension or extraction of the seat belt strap members 14 and 16 during sudden deceleration, some additional movement is allowed by the retractor in order to limit the loads on the occupant or to slow down the deceleration as provided with the present invention. The load limiting mechanism 80 may comprise a deformable metal band, one or more torsion bars, crash tubes, shear pins, or the like.

Figure 5:
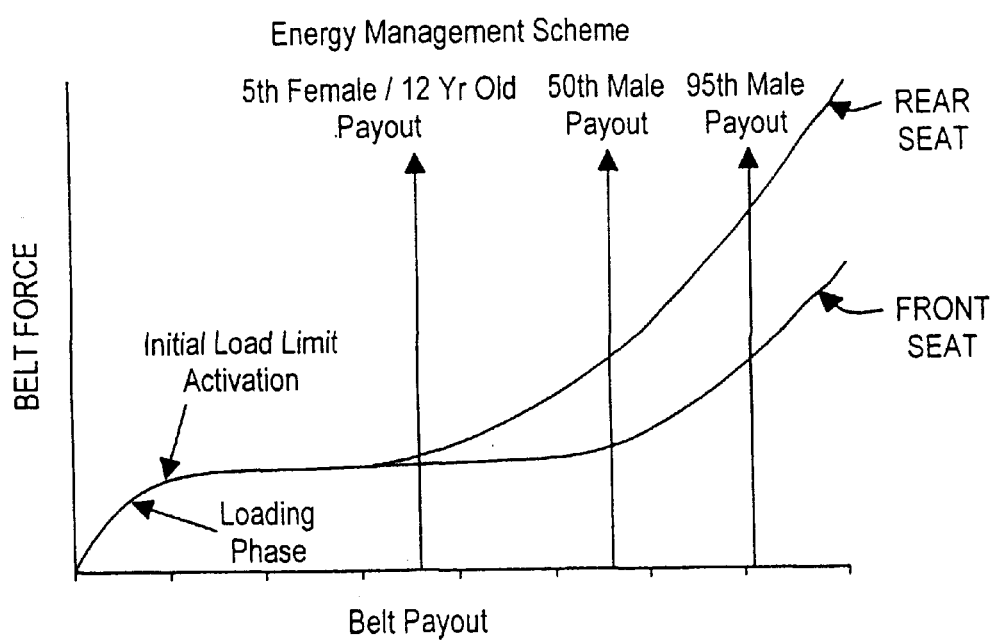
FIG. 5 is a graph illustrating an energy management scheme for an embodiment of the present invention.

Since occupants of vehicles are commonly of different sizes and weights and also occupy various portions of the vehicle (driver, front seat passenger, rear seat passenger), the load limiting scheme or system is preferably different for these different occupants and for different seat locations. Additionally, the load limiting scheme varies per type and model of vehicle. A single non-linear load limiting method preferably is used to accommodate all vehicle occupants with specific force and belt payout properties. A graph with curves illustrating a preferred load limiting system for use with the present invention is shown in FIG. 5. In FIG. 5, a belt payout versus belt force graph is shown, illustrating a belt payout versus force relationship and also dividing it into distinct phases for various occupants. An algorithm may be created that produces the proper amount of load limiting for various occupants as to correspond with the general shape of the curves shown for front and rear seats including the various load limiting schemes mentioned. The belt force values, belt payout values, and algorithm may differ for driver, front passenger, rear seat occupant positions, and vehicle type and model. The graph shown in FIG. 5 is only representative, and the exact curves and values would depend on the vehicle system and its implementation. When load limiting activates the shoulder belt allows a relatively low level of force to control occupant motion, which may be a benefit to all occupants, regardless of size, age, or weight. As payout distances increase, load limiting levels also increase which allows for maximum occupant motion in a controlled manner with limited maximum travel. Higher load limits will only be applied to occupants with seat locations near the full rearward track position. These are primarily larger occupants that typically have higher injury thresholds than smaller occupants.

The load limiting algorithm would control occupant motion and reduce force on the occupant's chest. The load limiting algorithm with stages designed for various occupant sizes is preferable because it allows for maximum energy management and reductions in injury risk. This benefits a wider range of occupants in a more optimum manner.

Another load limiting embodiment includes the use of a torsion bar 90, as shown in FIG. 2. The torsion bar 90 acts like a load limiter in that it can twist and become deformed out of shape in a crash or sudden deceleration event. During such an event, when the occupant's weight and chest are moving forwardly away from the seat or vehicle seat member, the torsion bar is allowed to twist and deform out of shape which limits the load applied to the occupant.

The present invention, itself and in combination with existing technologies such as pre-tensioners, load limiting devices, and the seat ramp prevents submarining. The present invention with its multiple configurations may be used in various vehicles having various different seating systems.

While the invention has been described in connection with one or more embodiments, it is to be understood that the specific mechanisms and techniques which have been described are merely illustrative of the principles of the invention, numerous modifications may be made to the methods and apparatus described without departing from the spirit and scope of the invention as defined by the appended claims.

What is claimed is:

1. A four-point seat belt restraint system for a vehicle seat comprising:

a pair of lap belt members connected at laterally opposite sides of the vehicle and having inner ends transversely connectable to one another across pelvic region of an occupant sitting on the seat;

first and second shoulder belt strap members for the vehicle seat, each of said shoulder strap members having first ends positioned on the occupant side of the vehicle seat and second ends positioned on the rear of the vehicle seat;

said first ends of said shoulder belt strap member being connected to a releasable buckle mechanism together with the inner ends of the lap belt members;

first and second spool mechanisms connected to the two second ends of said shoulder belt strap members, said spool mechanism being biased for coiling and holding portions of said shoulder belt strap members;

a common retractor mechanism operably connected to said first and second spool members for simultaneously operating said first and second spool members whereby said first and second shoulder belt members are coiled and uncoiled simultaneously; and a pair of gears at predetermined angles coupling said first and second spool members to said common retractor.

2. The four-point seat belt restraint system as described in claim 1 wherein said first and second spool members and said common retractor mechanism are positioned in the rear of the vehicle seat.

3. The four-point seat belt restraint system as described in claim 2 wherein the outer ends of the lap belt members are attached to the vehicle seat.

4. The four-point seat belt restraint system as described in claim 3 further comprising third and fourth biased spool members connected to the outer ends of the lap belt members.

5. The four-point seat belt restraint system as described in claim 1 wherein said buckled mechanism has two mating buckle portions and wherein the inner end of one of said lap belt members and the first end of the first shoulder belt strap member are connected to one of said buckle portions and the inner end of the other lap belt members and the second end of the second shoulder belt strap member are connected to the other of said buckle portions.

6. The four-point seat belt restraint system as described in claim 1 further comprising a load limiting mechanism on said common retractor mechanism for controlling the deceleration of the occupant on the vehicle seat wearing the seat belt restraint system.

7. A four-point seat belt restraint system for a vehicle seat comprising:
 a pair of lap belt members connected at laterally opposite sides of the vehicle seat and having inner ends transversely connectable to one another across pelvic region of an occupant sitting on the seat;
 first and second shoulder belt strap members for the vehicle seat, each of said shoulder strap members having first ends positioned on the occupant side of the vehicle seat and second ends positioned on the rear of the vehicle seat;
 said first ends of said shoulder belt strap member being connected to a releasable buckle mechanism together with the inner ends of the lap belt members;
 first and second spool members connected to the two second ends of said shoulder belt strap members, said spool members being biased for coiling and holding portions of said shoulder belt strap members;
 a common retractor mechanism operably connected to said first and second spool members for simultaneously operating said first and second spool members whereby said first and second shoulder belt members are coiled and uncoiled simultaneously; and
 a load limiting mechanism on said common retractor mechanism for controlling the deceleration of the occupant on the vehicle seat wearing the seat belt restraint system;
 wherein said load limiting mechanism comprises;
  a sprocket mechanically coupled to said first and second spool mechanisms; and
  a deformable metal band mechanically coupled to said sprocket and biasing said first and second spool mechanisms.

8. The four-point seat belt restraint system as described in claim 1 further comprising a momentum sensor mechanism operably associated with said common retractor mechanism for locking said retractor mechanism under certain sudden deceleration events.

9. A four-point seat belt restraint system for a vehicle seat:
 a pair of lap belt members connected at laterally opposite sides of the vehicle seat and having inner ends transversely connectable to one another across pelvic region of an occupant sitting on the seat;
 first and second shoulder belt strap members for the vehicle seat, each of said shoulder strap members having first ends positioned on the occupant side of the vehicle seat and second ends positioned on the rear of the vehicle seat;
 said first ends of said shoulder belt strap member being connected to a releasable buckle mechanism together with the inner ends of the lap belt members;
 first and second spool members connected to the two second ends of said shoulder belt strap members, said spool members being biased for coiling and holding portions of said shoulder belt strap members;
 a common refractor mechanism operably connected to said first and second spool members for simultaneously operating said first and second spool members whereby said first and second shoulder belt members are coiled and uncoiled simultaneously;
 a momentum sensor mechanism operably associated with said common retractor mechanism for locking said retractor mechanism under certain sudden deceleration events; and
 a gimble mechanism operably associated with said momentum sensor mechanism.

10. A four-point seat belt restraint system for a vehicle seat comprising:
 a pair of lap belt members connected at laterally opposite sides of the vehicle seat and having inner ends transversely connectable to one another across pelvic region of an occupant sitting on the seat;
 first and second shoulder belt strap members for the vehicle seat, each of said shoulder strap members having first ends positioned on the occupant side of the vehicle seat and second ends positioned on the rear of the vehicle seat;
 said first ends of said shoulder belt strap member being connected to a releasable buckle mechanism together with the inner ends of the lap belt members;
 first and second spool members connected to the two second ends of said shoulder belt strap members, said spool members being biased for coiling and holding portions of said shoulder belt strap members;
 a common retractor mechanism operably connected to said first and second spool members for simultaneously operating said first and second spool members whereby said first and second shoulder belt members are coiled and uncoiled simultaneously; and
 a dual payout single retractor connected to the outer ends of the lap belt members.

11. The four-point seat belt restraint system as described in claim 1 further comprising strap guide members adjacent to a head restraint of the vehicle seat for guiding said first and second shoulder belt strap members through the head restraint.

12. The four-point seat belt restraint system as described in claim 1 further comprising a first cinching mechanism for a first lap belt of said pair of lap belts and a second cinching member for a second lap belt of said pair of lap belts.

13. A vehicle seat system comprising:
 a four-point seat belt restraint system for a vehicle seat comprising;
 a pair of lap belt members connected at laterally opposite sides of the vehicle and having inner ends transversely connectable to one another across pelvic region of an occupant sitting on the seat;
 first and second shoulder belt strap members for the vehicle seat, each of said shoulder strap members having first ends positioned on the occupant side of the vehicle seat and second ends positioned on the rear of the vehicle seat;
 said first ends of said shoulder belt strap member being connected to a releasable buckle mechanism together with the inner ends of the lap belt members;
 first and second spool mechanisms connected to the two second ends of said shoulder belt strap members, said spool mechanism being biased for coiling and holding portions of said shoulder belt strap members;

a common refractor mechanism operably connected to said first and second spool members for simultaneously operating said first and second spool members whereby said first and second shoulder belt members are coiled and uncoiled simultaneously;

a pair of gears at predetermined angles coupling said first and second spool members to said common retractor; and a seat ramp;

said four-point seat belt restraint system and said seat ramp preventing "submarining" of an occupant.

14. The vehicle seat system as described in claim 13 further comprising strap guide members adjacent to the top of the vehicle seat for guiding said first and second shoulder belt strap members over the top of the vehicle seat.

15. The vehicle seat system as described in claim 13 further comprising a dual payout single retractor connected to the outer ends of the lap belt members.

16. The vehicle seat system as described in claim 13 wherein said first and second spool members are attached at opposite sides of the vehicle seat system.

17. The vehicle seat system as described in claim 13 wherein said first and second spool mechanism and said common retractor mechanism are within or at a location selected from the group consisting of: a seat back, a head restraint, behind said seat back, on a vehicle structure.

18. The vehicle seat system as described in claim 13 further comprising a load limiting mechanism on said common retractor mechanism for controlling the deceleration of the occupant on the vehicle seat wearing the seat belt restraint system.

19. The vehicle seat system as described in claim 13 further comprising a first cinching mechanism for a first lap belt of said pair of lap belts and a second cinching member for a second lap belt of said pair of lap belts.

20. A vehicle seat system comprising:

a four-point seat belt restraint system for a vehicle seat comprising;

a pair of lap belt members connected at laterally opposite sides of the vehicle and having inner ends transversely connectable to one another across pelvic region of an occupant sitting on the seat;

first and second shoulder belt strap members for the vehicle seat, each of said shoulder strap members having first ends positioned on the occupant side of the vehicle seat and second ends positioned on the rear of the vehicle seat;

said first ends of said shoulder belt strap member being connected to a releasable buckle mechanism together with the inner ends of the lap belt members;

first and second spool mechanisms connected to the two second ends of said shoulder belt strap members, said spool mechanism being biased for coiling and holding portions of said shoulder belt strap members;

a common retractor mechanism operably connected to said first and second spool members for simultaneously operating said first and second spool members whereby said first and second shoulder belt members are coiled and uncoiled simultaneously;

a pair of gears at predetermined angles coupling said first and second spool members to said common retractor;

a load limiting mechanism on said common refractor mechanism for controlling the deceleration of the occupant on the vehicle seat wearing the seat belt restraint system;

a third and fourth biased spool mechanisms connected to the outer ends of the lap belt members; and a seat ramp;

said four-point seat belt restraint system and said seat ramp preventing submarining of an occupant.

* * * * *